Figure 1:
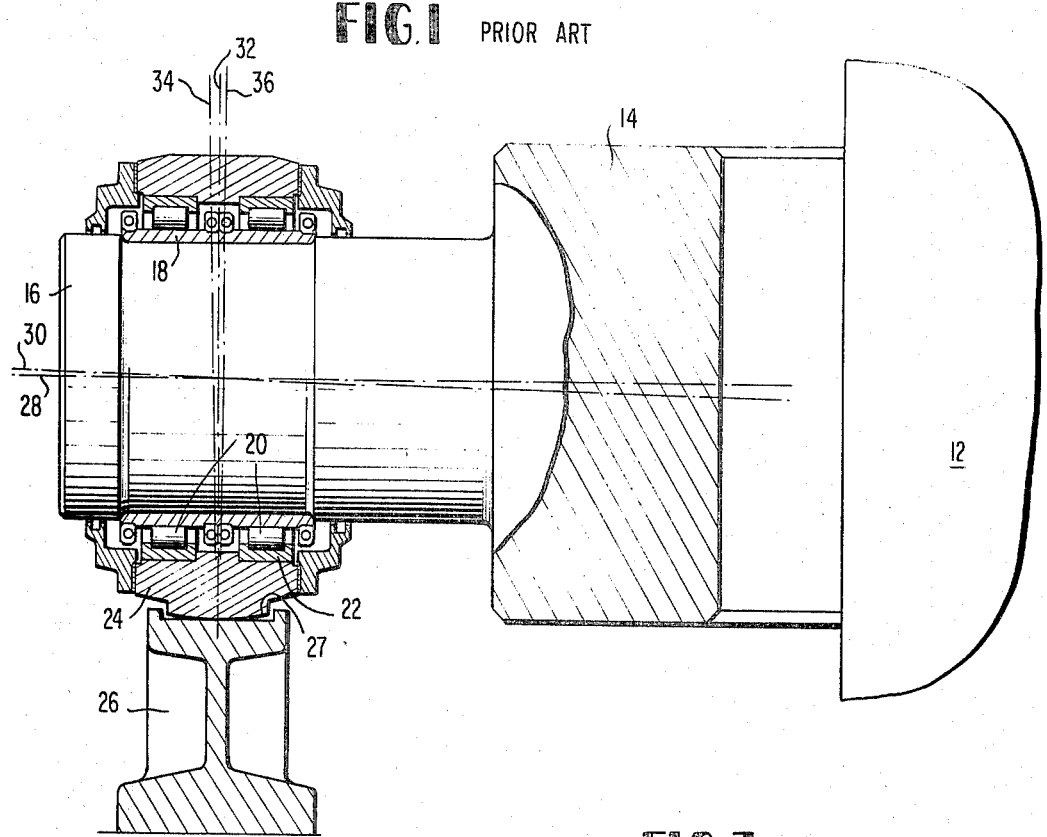

United States Patent [19]
Martt

[11] 3,746,328
[45] July 17, 1973

[54] FLUID BEARING SUPPORT FOR TILTABLE METALLURGICAL VESSELS

[75] Inventor: Judson W. Martt, Amsterdam, Ohio

[73] Assignee: National Steel Corporation, Pittsburgh, Pa.

[22] Filed: Sept. 28, 1971

[21] Appl. No.: 184,560

[52] U.S. Cl. .................................. 266/36 P, 308/9
[51] Int. Cl. ............................................. C21c 5/46
[58] Field of Search ............... 266/35, 36 P; 308/9, 308/122

[56] References Cited
UNITED STATES PATENTS
3,291,541  12/1966  Dellinger ........................ 266/36 P
3,422,650   1/1969  Strance .............................. 308/9 X Primary Examiner—Gerald A. Dost
Attorney—Shanley and O'Neil

[57] ABSTRACT

Concept and application of balanced fluid load support of tiltable, heavy loads, for example metallurgical vessels such as a basic oxygen furnace. Fluid bearing structures are provided which compensate for sag along the axis of BOF trunnion shafts due to the weight of the vessel and its load and also compensate for effects of sag during repeatedly changing load and tilting conditions. Such fluid bearing structures also provide for expansion along the axis of the trunnion shafts due to changing temperature conditions encountered by the vessel and its support structure, provide for long-life ease of rotation of the vessel about the trunnion shaft axis, and further provide indications of bearing operating conditions.

15 Claims, 9 Drawing Figures

PATENTED JUL 17 1973　　　3,746,328

SHEET 1 OF 5

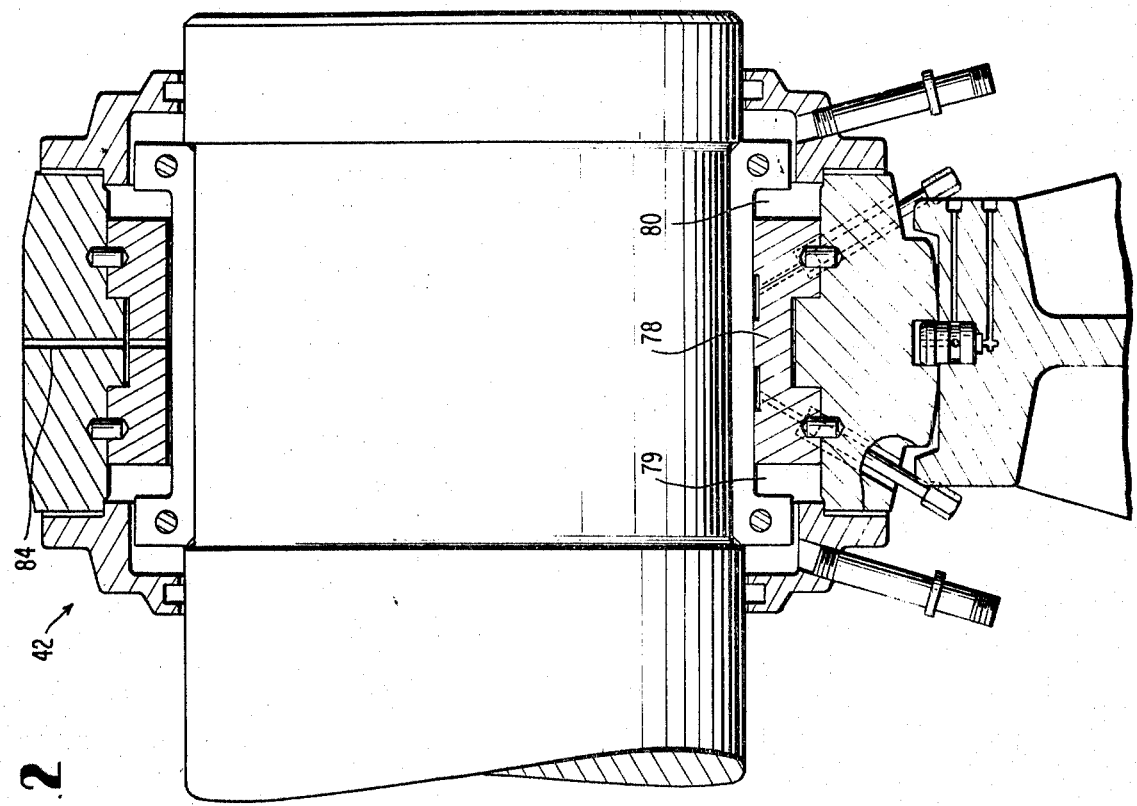
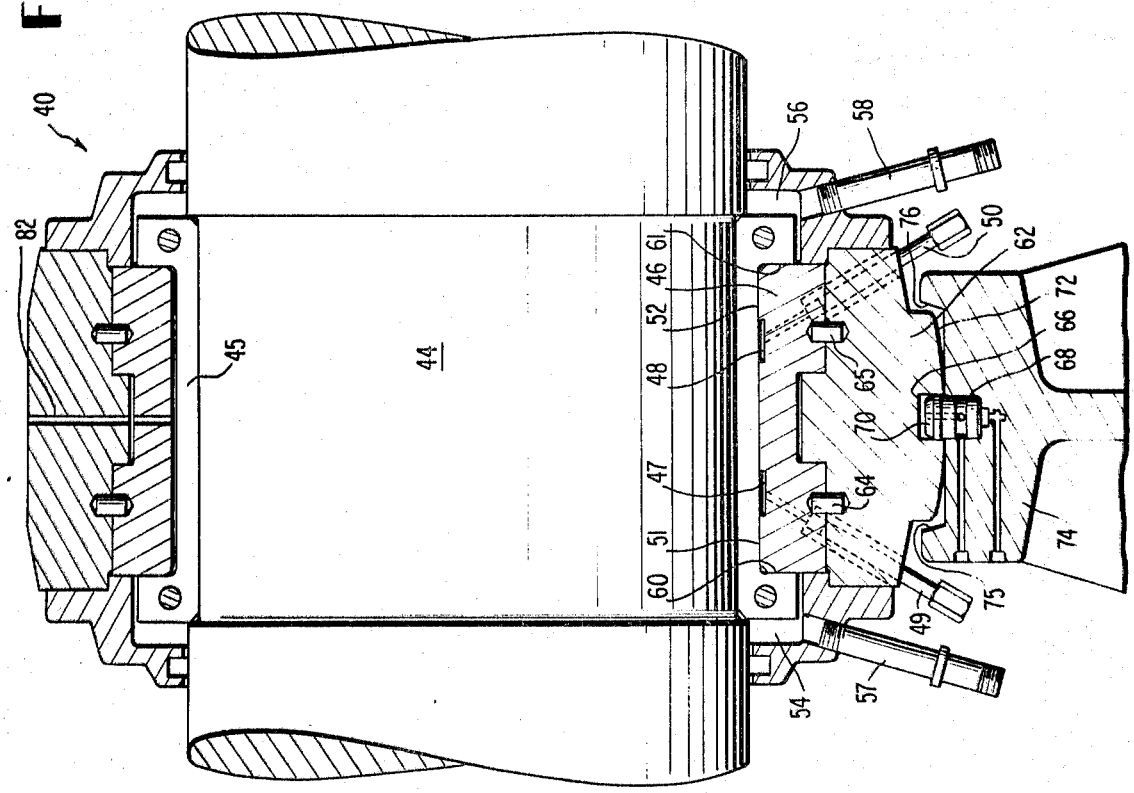
FIG.2

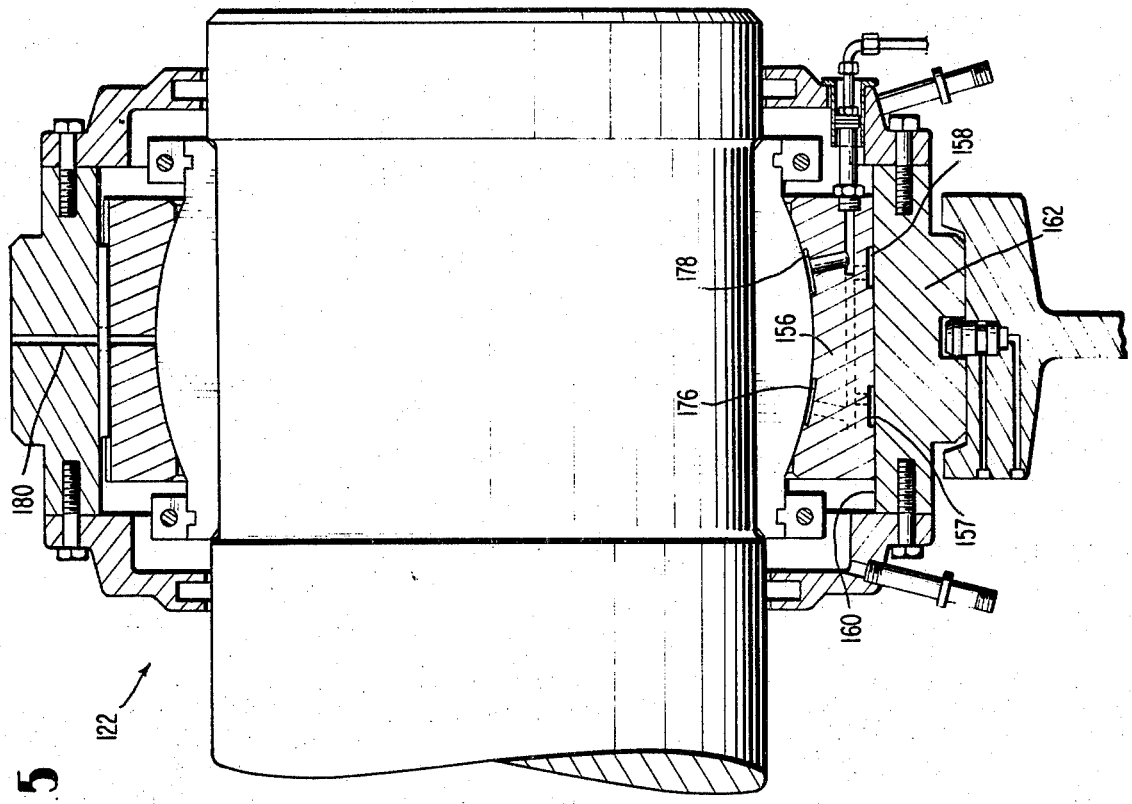

FLUID BEARING SUPPORT FOR TILTABLE METALLURGICAL VESSELS

This invention is concerned with balanced fluid support for heavy tiltable loads such as basic oxygen furnaces.

More particularly this invention is concerned with fluid support of trunnion shafts for tiltable vessels providing self-aligning compensation for deflection along the axis of such trunnion shafts, providing for thermal expansion and contraction along a direction parallel to the trunnion axis, providing indications of operating conditions of such bearings, and providing an automated monitoring system for protecting bearing structures.

Trunnion rings with oppositely disposed trunnion shafts are used to support metallurgical vessels used for hot metal processing or handling large tonnages of hot metal. A typical vessel is a basic oxygen furnace used for refining steel. These vessels must ordinarily be tiltable through a full 360° in either direction to allow for charging, processing steps such as slag removal, and discharging. The trunnion shafts are supported on bearing stands on opposite sides of the vessel which provide clearance for rotation of the vessel during processing. Tonnage capacity for such vessels can exceed 300 tons. Refractories weigh some 500 tons and the vessel and trunnion support structure weigh about 600 tons. Such heavy tonnages, coupled with temperature differentials during operation, which can exceed 3,000° F., and changing load stresses create special bearing and support structure problems.

In the past there has been no alternative to massive mechanical bearing structures for such vessels. Notwithstanding the massiveness of such prior art structures, experience has proved them to be of limited and unpredictable life. More importantly, their suitability is brought into question most seriously by the costly immobilization of a vessel which occurs upon bearing failure. Notwithstanding these shortcomings, and some thirty years of developement in the basic oxygen furnace field, no commercially practical alternative to such mechanical bearings has been advanced prior to the present invention.

The prior art bearing problems, which are believed to result from unusual stresses caused by aging and changing load and temperature conditions during operation, are substantially eliminated by a novel concept supplanting mechanical contact with fluid load support and the provision of fluid bearing structure which provides for rotation of the vessel, balance of the load, compensation for sag distortion, and allowance for thermal expansion and contraction. The result is that bearing life, notwithstanding the severe conditions involved during processing large tonnages of hot metal, can, in effect, be unlimited. Moreover, since bearing operation can be monitored, bearing structure damage can be avoided, and upkeep work forecast.

Figure 3:
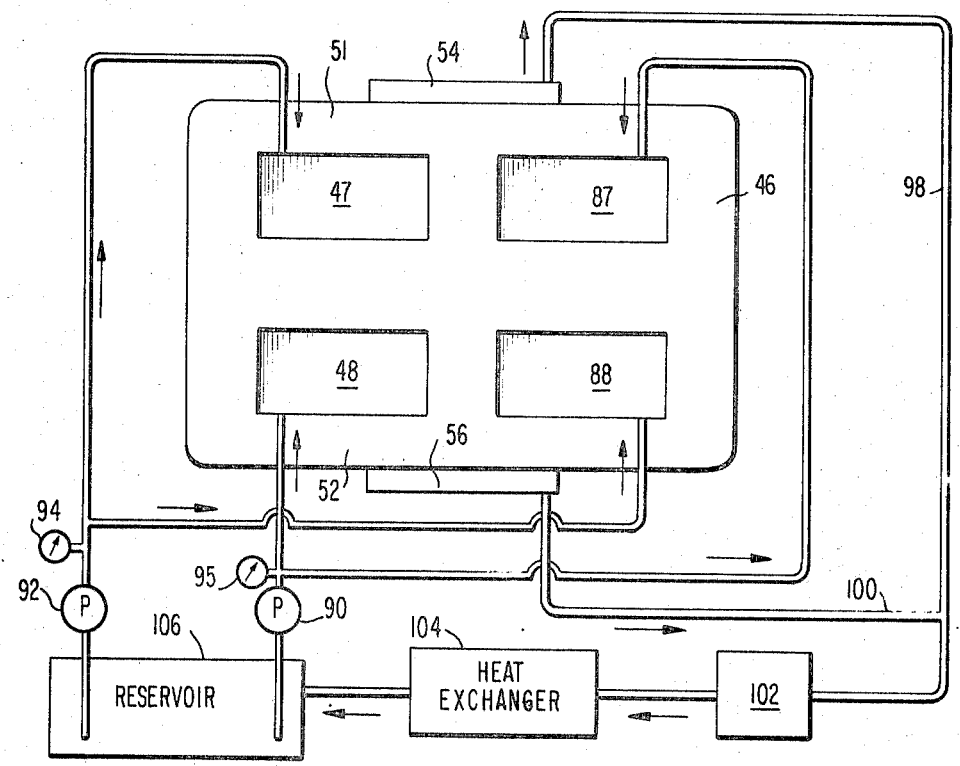
Figure 4:
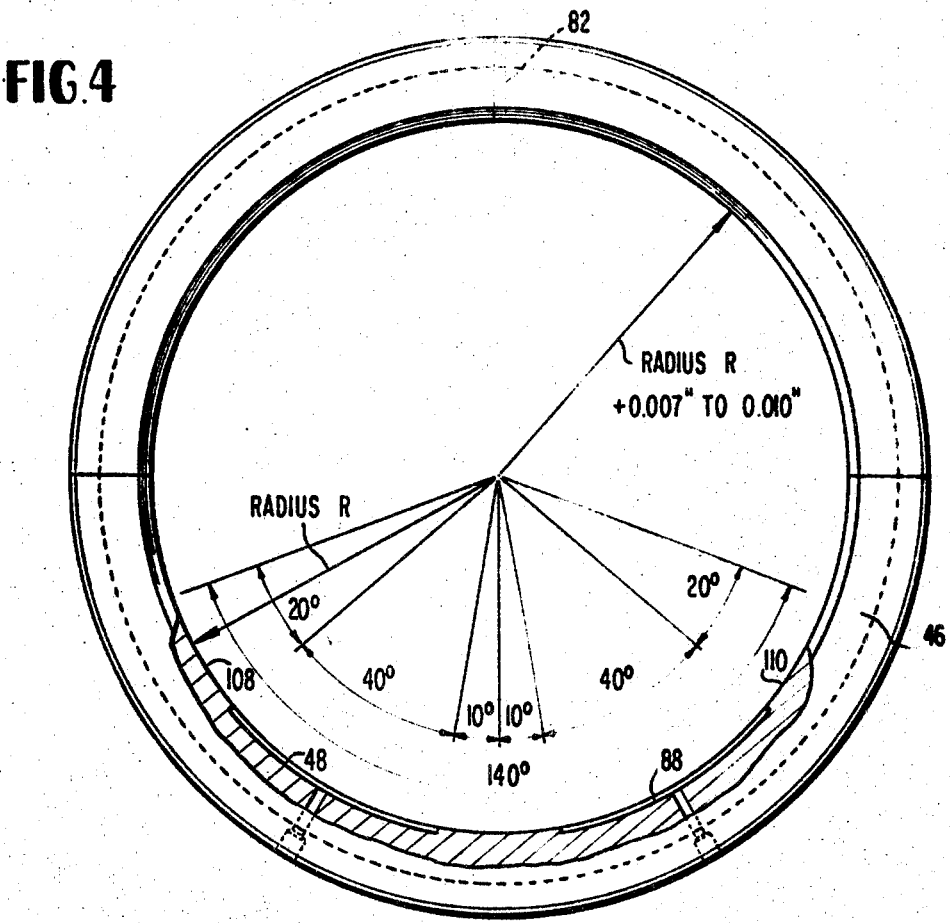
Figure 6:
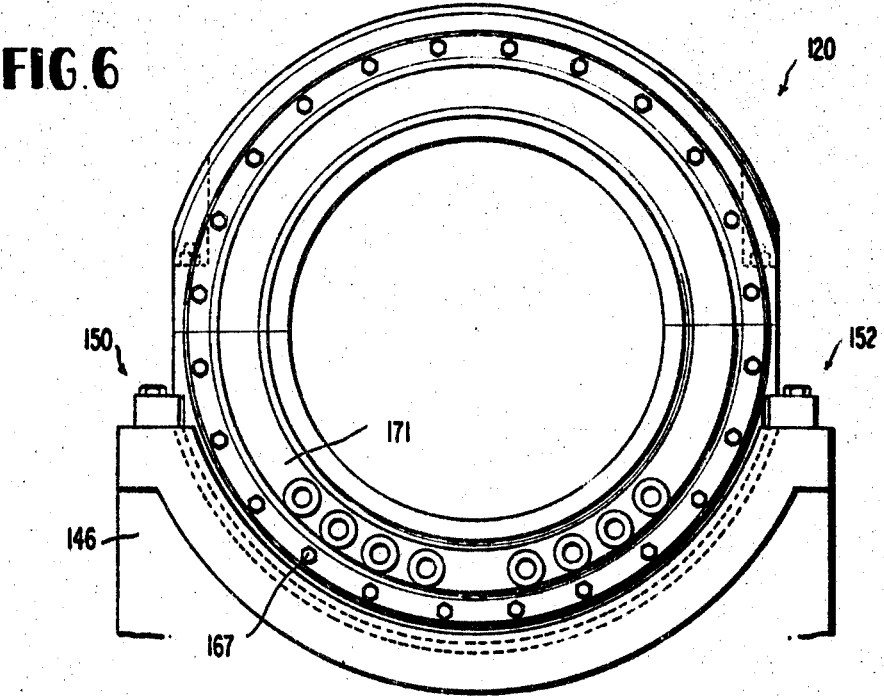
Figure 7:
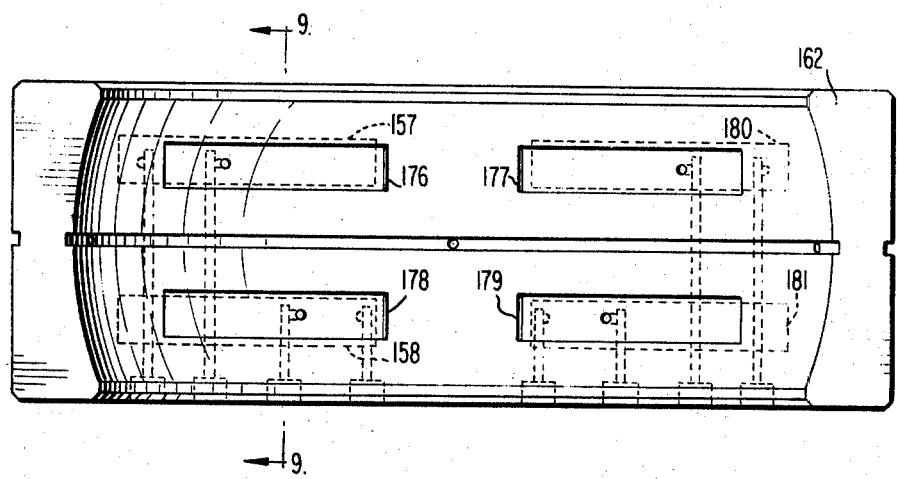
Figure 8:
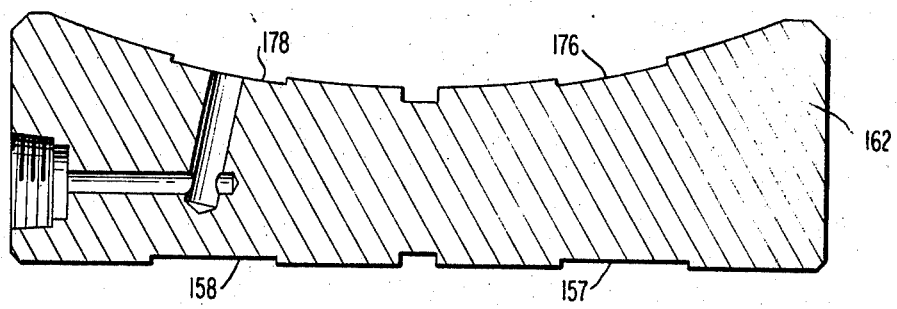
Figure 9:
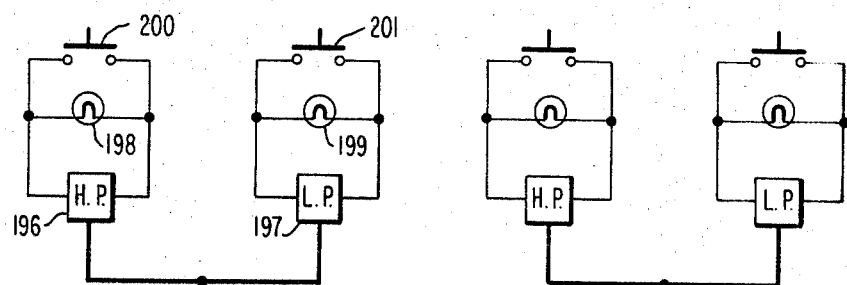

The accompanying drawings to be utilized in analyzing the probelms of the prior art and disclosing the invention are identified briefly as follows:

FIG. 1 is a cross sectional view of prior art mechanical bearing structure with schematic presentation of associated trunnion ring and vessel, FIG. 2 is a cross sectional view of an embodiment of the present invention showing fixed and expansion bearing structures which are disposed on opposite sides of a load, FIG. 3 is a schematic presentation of a fluid pressure supply system of the present invention, FIG. 4 is a schematic sectional view, with portions cut away, in a plane perpendicular to a shaft axis for a tiltable load showing the angular disposition of fluid pressure load support areas of the present invention, FIG. 5 is a cross sectional view of another embodiment of the present invention presenting fixed and expansion bearing structures which are disposed on opposite sides of a load, FIG. 6 is a side elevational view of the bearing structure of FIG. 5, FIG. 7 is a plan view of a bearing block used in the embodiment of FIG. 5 with subsurface portions shown in dotted lines, FIG. 8 is a cross sectional view of the bearing block of FIG. 7 and FIG. 9 is a schematic circuit diagram of a bearing monitoring system embodying the invention.

FIG. 1 shows a portion of a tiltable vessel and the bearing structure for one trunnion shaft. As is known, the trunnion shafts are customarily oppositely disposed with relation to a vessel and, bearing structures are provided on opposite sides of the vessel supporting the trunnion shafts. The mechanical bearing structure of FIG. 1 is typical of available bearing structures.

Vessel 12 is secured to trunnion support structure 14. Trunnion shaft 16 is customarily integral with such support structure being either unitary from manufacture or made integral during assembly.

The most advanced form of bearing structure developed in the prior art for metallurgical vessels was the basic anti-friction roller bearing design. In such structures, inner sleeve 18 is cylindrical and surrounds trunnion shaft 16. Anti-friction roller bearings 20 are disposed about the entire periphery of inner sleeve 18 within bearing shoe 22 providing the full 360° bearing support which was felt to be necessary in the prior art. Bearing outer case 24 surrounds the bearing shoe 22.

Pedestal 26 supports the entire bearing structure at the desired height and provides the necessary clearance for rotation of the vessel. The outer periphery of the outer case 24 has a curved surface 27 contacting the support surface of pedestal 26. Theoretically curved surface 27 could allow for a limited angular movement of the bearing structure in the plane of the trunnion shaft axis. With the tonnages involved, it is evident this theoretical movement on curved surface 28 does not occur. In practice the effect of shaft deflection shows up in the bearing and, cracking of the bearing structure occurs.

Line 28 presents the normal axis of rotation. In the analysis of prior bearing failures leading to the present invention, it has been discovered that permanent sagging occurs along the trunnion axis. When the vessel is in the upright position, an interior portion of the trunnion shaft axis sags below the normal (true horizontal in embodiment shown) axis of rotation and an exterior portion becomes disposed above such axis. This dislocation of the trunnion shaft axis is represented by the dotted line 30.

The effect of such distortion along the trunnion axis on a vertical axis 32 (through the bearing structure perpendicular to the normal axis of rotation) is shown by dotted lines 34 and 36. If line 32 designates the normal location of a vertical plane through a normal bearing structure before sagging occurs, this vertical plane is urged to take various positions during tilting of the vessel in opposite directions due to the distortion existing along the trunnion shaft. Several of these are indicated by the positions of the lines 34 and 36.

It is postulated that, with the heavy loads encountered, substantially no movement on surface 27, or extremely limited movement, was available with this prior art structure. In any event, the deflection which occurs along the trunnion axis cannot be adequately compensated for by the prior art structures and, because of the prior mechanical limitations, cracking of the bearing shoe or other bearing parts occurred. Experience has indicated that notwithstanding the finest bearing materials, structural design, and maintenance available in the prior art, distortion and cracking of one or more of the bearing parts occurs. Further such occurrence is unpredictable and grindage of the bearing parts immobilizes the vessel.

A major disadvantage of the prior art was that no way existed to measure bearing performances until too late. No way of obtaining a warning of impending bearing failure, or an indication of poor or faulty operation, existed in fact or conception.

An improtant contribution of the present invention is the concept of fluid support for high tonnage, weight shifting, tiltable loads; important portions of this concept include specific fluid bearing structures which provide for ease of rotation, compensation for sag distortion, allowance for thermal expansion and contraction, monitoring of bearing performance, and controlling operation responsively to such monitoring.

In applying the principles of the present invention, the full 360° of bearing contact of the prior art is eliminated and fluid pressure acting on a predetermined limited portion of the trunnion shafts is used to raise, and balance, the trunnion shafts several thousandths of an inch off associated load supporting mechanical structure. Fluid load support is provided throughout a predetermined major portion of the bottom arc (load bearing surface at any instant) of the trunnion shafts. The remainder of such lower arc and the upper arc around the upper surface of the trunnion shafts, are provided with several thousandths of an inch relief to permit measured spacing (raising) of the shafts out of mechanical contact.

FIG. 2 shows a specific embodiment of the invention in which fixed bearing structure 40 is located at the drive end of the shafts for a tiltable vessel. Expansion bearing structure 42, providing horizontal floatation for thermal expansion and contraction, is located at the opposite dimetrical end of the vessel.

Referring to fixed bearing structure 40, shaft 44 is surrounded by sleeve 45 secured to the shaft. Bearing block 46 defines the bearing raceway and includes fluid bearing pads 47 and 48; fluid under pressure is supplied to these pads through conduits 49 and 50.

The fluid bearing pads in the bearing block are surrounded by sill areas, designated 51, 52, over which the hydraulic fluid travels under pressure to be accumulated in the annular caps 54, 56 surrounding the shaft. The hydraulic fluid, typically a 1,200 SSU oil, is retrieved for reuse through conduits 57 and 58. Fluid bearing pads such as 47 and 48, along with the sill areas, at both the fixed and expansion bearing sides of the vessel provide fluid support of the load by lifting the shafts within the surrounding structure. Provision for such lifting is discussed in greater detail later.

In the fixed bearing structure 40, bearing block 46 abuts the shoulders 60, 61 of sleeve 45. Also bearing block 46 is secured to outer case 62 by pin means 64, 65. This structure fixes the position of the bearing preventing horizontal movement and differs from the horizontal expansion bearing structure 42 considered in more detail later.

Outer case 62 is positioned radially outwardly from bearing block 46 and at its bottom surface includes a recess 66 oppositely disposed to a recess 68 of a pedestal. Within such relief portions, cartridge 70 prevents movement of the outer case in a direction parallel to the longitudinal axis of the trunnion shafts. A curved surface 72 is provided on the periphery of the outer case 62. Pedestal 74 is provided with tapered surfaces 75, 76, as a safety measure, to avoid possible contact between the outer case and the pedestal.

Referring to the expansion bearing structure 42, at the diametrically opposite end of the load, note that bearing block 78 is foreshortened in a direction parallel to the trunnion shaft axis providing expansion and contraction spaces 79 and 80. The bearing sleeve is "floated" on the bearing block by the fluid pressure with spaces 79 and 80 allowing movement in a direction parallel to the shaft axis.

Measurement of the lift provided as part of the invention through the fluid pads is made through depth gauge aperture 82 on the fixed bearing structure and depth gauge 84 on the expansion bearing structure.

A plan view of the pads in the lower arc of one trunnion shaft is shown in FIG. 3. Bearing block 46 includes pads 47, 48 and 87, 88. As part of the deflection compensation and monitoring features of the present invention, alternate pads 48 and 87 are supplied from pump 90 and remaining alternate pads 47 and 88 are supplied from a separate means, pump 92. This supply of alternate pads by separate fluid pressure lines helps compensate for the angularity (sag) induced in the trunnion shaft. For example, dependent on the direction of tilting of the vessel, pads 48 and 87 may hold a pressure around 2,000 psi while pads 47 and 88 are holding a pressure around 500 psi. With opposite tilting of the vessel, these pressures gradually reverse with pads 47 and 88 ultimately holding around 2,000 psi and while pads 48 and 87 are holding around 500 psi. These changes in pressure can be visualized by picturing rotation of a shaft having a sag angle along its axis as shown while, at the same time, picturing that the supporting mechanical structure and bearing block 46 are oriented to the normal (true horizontal) axis of rotation. Of course, similar separate supplies of alternate pads is provided to support the remaining trunnion shaft.

The pressures held by the pads (determined by relative orientation of shaft) are monitored by meters such as 94, 95 which can be visual reading and recording type providing an indication of operation based on the predictable sequential change in pressures with opposite direction tilting of the vessel.

The return path for fluid from annular cap 54 is provided through line 98 and, from annular cap 56, through line 100. Such oil is returned through strainer 102 and heat exchanger 104 to reservoir 106.

As shown, in the side view of the bearing in FIG. 4 fluid pads 48 and 88 each extend over approximately 40° of the lower arc with an intermediate sill of 20°. Sills 108 and 110 on opposite sides of the fluid pads are 20° each; providing a total fluid load support area extending over about 140°. This limited arc fluid bearing provides balanced support for the load with remaining arc providing non-contact spacing permitting raising of the shaft and providing for angled movement of the shaft.

The radius of the bearing block 46 at the sill area is about seven to ten thousandths of an inch less than the radius of the bearing block outside the fluid bearing area; i.e., the radius through the 220° including the upper arc is about seven to ten thousandths of an inch greater than the radius of the 140° fluid load support portion.

The cartridge in each bearing structure, such as cartridge 70 in fixed bearing structure 40, is used to anchor the bearing structure and is provided with a configuration to allow for some compensation for relative movement of a sagging shaft in addition to that provided by the fluid pads. In practice however, the fluid bearings provide substantially all the compensation required.

During operation the fluid pressures encountered and sustained through the pads at any instant are monitored and provide an indication of normal operation of the hydrostatic system and bearing structure. At the start of operations the shafts are raised several thousandths of an inch within the bearing blocks. In this embodiment for handling a basic oxygen furnace, the pads have a width of slightly less than 4 inches and a total area around 225 square inches, and higher, per trunnion shaft. The surrounding sill area is about nine hundred square inches, and higher, providing a total area, through the 140° of arc, which approaches 1,200 square inches. Although a representative hydrostatic system for the specific embodiment can have a capacity around 5,000 psi, once in operation pressures ordinarily do not greatly exceed 2500 psi when carrying a total load of about 1,500 tons.

The depth of the pads is approximately one-fourth inch. A clearance of about ten thousandths inch, when working with a shaft diameter of slightly less than 50 inches, readily compensates for the deflection resulting from one degree of angularity along the trunnion shaft. Recognizing the permanent "sag" in these structures, the invention provides compensation without disrupting the ease of rotation necessary to long life.

The dimensions, clearances, pad and sill areas, and the like, shown and described provide a complete disclosure of a workable embodiment of the invention for approximately fifteen hundred ton loads. Such disclosure provides the basis for those skilled in the art to arrive at other dimensional characteristics and arrangements for carrying differing loads and for differing embodiments.

FIG. 5 and related figures present a preferred shaft deflection compensation system with distinct groups of fluid bearing pads providing distinct functions in compensating for shaft sag and allowing for thermal expansion and contraction along a direction parallel to the normal axis of rotation while providing for ease of rotation.

Fixed bearing structure 120 is at the left in FIG. 5 and expansion bearing structure 122 at the right. Each bearing structure provides a spherical fluid bearing surface (curvilinear in cross-sectional configuration along a radial plane as in FIG. 5). Such spherical surface concept is an important contribution in compensating for shaft sag whether of a temporary or permanent nature.

Also, a separate cylindrical fluid bearing surface (rectilinear in cross sectional configuration along a radial plane as in FIG. 5) is provided for floating action at the expansion bearing structure.

In this embodiment a sleeve 126 forms part of the trunnion shaft means by virtue of being secured to shaft 124. Sleeve 126 has an outer spherical surface 128. Bearing block 129 includes a similar spherical surface 130 substantially matching the configuration of the sleeve surface 128. Fluid bearing pads 134, 136, and their surrounding sill areas exist between these contiguously-associated spherical surfaces.

The outer surface of bearing block 129, which outer surface has the curvilinear configuration of a cylinder, includes bearing pads 140, 142 and surrounding sill area. The bearing block 129 is supported by outer case 144.

Pedestal 146 is provided with a centering cartridge 148. Outer case 144 rests on the pedestal 146 and is centered, during assembly, on the pedestal by cartridge 148. The surfaces between the outer case and the pedestal are in contact throughout substantially their full width and no sag compensation movement is possible along those surfaces.

FIG. 6 which is a side elevational view of the bearing structures of FIG. 5 shows locking structures 150, 152 for locking the bearing outer case to the pedestal.

Referring to expansion bearing 122 shown in the right hand portion of FIG. 5, note that bearing block 156 at its lower surface includes bearing pads 157 and 158 and surrounding sill area, resting on the upper surface 160 of outer case 162. These pads are supplied through the fluid pressure lines shown in dotted lines and customarily employ a separate supply line from that pressurizing the pads on the spherical surface. Note in particular that the surface 160 is of straight-line configuration in the radial plane cross-section view shown with no obstructions contacting the bearing block. Thus bearing block 146 can move back and forth in a direction parallel to the normal axis of rotation compensating for thermal expansion and contraction of the entire vessel structure.

This contrasts with the structure of fixed bearings 120. In the fixed bearing structure 120, bearing block 144 is prevented from the movement parallel to the axis described above by annular rings 164, 165 which abut bearing block 144 on either side. These annular rings are made integral with outer case structure by locking means, such as bolts 166, 167.

Referring again to the fixed bearing structure 120 of FIG. 5, note that the path of fluid discharge from bearing pads 136 and 140 is along the sill areas of each adjacent the bearing pads and into the cavities 172, 173 defined by the bearing caps 170, 171 and out the discharge pipes 174, 175.

It should be noted that while fluid bearing pads 140 and 142 are shown in fixed bearing structure 120 of FIG. 5, these bearing pads are not required and are not to be used (no pressure supply lines in embodiment shown). In order to reduce the number of spare parts required in commercial practice, the bearing blocks for the fixed and expansion bearing structures have been designed to be identical. However, the expansion and contraction floatation pads for the fixed side are not connected up during assembly, nor used during operation.

In operation of the embodiment of FIG. 5, the shaft and its sleeve are raised within the outer case by fluid bearing pads such as 134, 136 on the fixed bearing structure and fluid bearing pads such as 176 and 178 on the expansion bearing structure block 156. With the matching curved surfaces of the outer peripheral surface of the cylindrical sleeve and the inner peripheral surface of the bearing block, compensation for shaft sag is readily provided when the load is raised off the bearing blocks by the fluid pressure.

As in the earlier described embodiment, a recessed area above the load bearing area of approximately ten thousandths of an inch is provided. Raising of the shaft and sleeve is measured in the depth gauge structure 180. The depth to the center portion of the outer periphery of the cylindrical sleeve is measured.

The matching curvilinear surfaces concept with the fluid load bearing features of the present invention provides ideal deflection compensation allowing relative movement between the two spherical surfaces in the plane of the shaft axis due to shaft sag while maintaining ease of rotation of the shaft about its axis so that unlimited bearing life is provided by the present invention.

FIG. 7 shows a plan view of the bearing block 156 with portions of the subsurface outer periphery of the bearing block shown in dotted lines. In FIG. 7 the fluid pressure pads on the inner periphery of the bearing block are shown in solid lines and designated 176 through 179.

The fluid pressure pads for floatation to allow for expansion and contraction movement are shown in dotted lines designated 157, 158 and 180, 181.

FIGS. 7 and 8 show the locations of the fluid pressure pads and the configuration of the bearing block for this embodiment. Each of the fluid pads in this embodiment extends over 40° of its respective arc about the inner and outer periphery of the bearing block with intermediate arcs of 20° of sill area and an exterior sill area bringing the total load bearing area in each bearing structure to 140°. The overall width of the bearing block of FIG. 8 (measured in a direction parallel to the shaft axis) is about 23 inches. The spherical radius of the spherical surface is about 28 inches and the chord length across the spherical surface is about 20 inches. The pads on the spherical surface are slightly less than 3½ inches in width and the intermediate sill area, next to each, is approximately the same. Each of the floatation pads, e.g. 157 and 158, are about 3½ inches in width.

The dimensions and configurations shown provide for balanced load support for total weights of about 1,500 tons. With these disclosure data, the invention can be applied to other vessels or other load situations similar to that of BOF vessels. However, the invention is not limited to the specific embodiments described for disclosure purposes. The inventive concept of the invention is applied in a heavy, tiltable load environment and involves use of bearing block structure in which a portion of the raceway defined by the bearing block is of greater radius than a predetermined load bearing portion. Fluid pressure supplied to the load bearing portion holds the load in balanced relationship i.e., spaced out of mechanical contact with the bearing block structure. This spaced relationship is used to compensate for the angled disposition of the shaft resulting from shaft sag and permits the load to be tiltable, notwithstanding angled disposition, without causing bearing breakage.

The spherical surface disclosed in the FIG. 5 embodiment can be positioned otherwise in combination with a purely cylindrical sleeve so that the spherical surfaces can be located on the outer surface of the bearing block and the inner surface of the outer case. Such modifications of the illustrated embodiments fall within the scope of the invention which provides bearing block means for circumscribing a tiltable shaft and having intermediate fluid support means for acting on a limited portion of the tiltable shaft means to raise the shaft means within the bearing block and support the shaft means in spaced relationship from the bearing block means during tilting of the shaft means.

Customarily the bearing block would be made of bronze and, in general, supporting structure can be selected from steels well known in the art.

In addition to the monitoring available with the hydraulic system shown in FIG. 3 and the depth gauges discussed earlier, the invention makes possible a system for monitoring bearing operation and automatically stopping tilting movement should discrepancies occur in the fluid bearing operation. Referring to FIG. 9, fluid bearing pads are supplied from two separate pumps 190, 191. As shown these systems supply alternate pads of bearing 192 through lines 194, 195.

Each of these separate fluid pressure supply systems is monitored by a high pressure switch and a low pressure switch. For example, as shown connected to fluid pressure line 194, high pressure switch 196 operates when pressure exceeds a predetermined limit, such as 4,400 psi. Low pressure switch 197 operates when the pressure falls below 400 psi. The high and low pressure switches are interlocked with the vessel tilt drive (not shown) so the vessel cannot be rotated when abnormal pressure conditions occur.

Each pressure switch is associated with a warning light such as 198, 199 and a bypass switch such as 200, 201 for use during checking and repair. Pressure indications and recording can be utilized so that normal cyclical variations of pressures between the alternate pad pressure supplies can be monitored and variation from normal operation readily highlighted from past recorded and/or otherwise established standard operations.

While various materials and details of specific embodiments of the invention have been set forth for disclosure purposes, it is understood that departure from these specifics can be made within the spirit of the invention. Therefore in determining the scope of the invention reference should be made to the appended claims.

I claim:

1. In combination with a heavy-tonnage tiltable metallurgical vessel for hot metal, such as a basic oxygen furnace, trunnion support structure providing peripheral support for such vessel, trunnion shaft means integral with such support structure, the trunnion shaft means being on opposite sides of the vessel and defining a trunnion axis, fluid pressure support means disposed to circumscribe a predetermined limited portion of the trunnion shaft means so as to provide balanced fluid bearing load support for the vessel, and supply means for delivering fluid under pressure to the fluid pressure support means.

2. The combination of claim 1 in which the fluid pressure support means include a plurality of fluid pressure pads disposed in load supporting relationship about such limited portion of the trunnion shaft means.

3. The combination of claim 2 in which the predetermined limited portion of the trunnion means circumscribed by the fluid support means comprises about 140°.

4. The combination of claim 2 in which the plurality of fluid pressure pads include at least two fluid pressure pads on each side of a vertical plane through the trunnion axis, and further including
a plurality of fluid pressure supply means each connected to at least a pair of fluid pressure pads located in diagonally opposed spaced relationship on opposite sides of the vertical plane through the trunnion axis so as to at least partially compensate for sag along the trunnion axis while maintaining fluid pressure support for ease of tilting of the vessel.

5. The combination of claim 1 in which the trunnion shaft means comprises a pair of shafts diametrically opposed with respect to the vessel, with each shaft having associated mechanical support structure, and including
means providing for thermal expansion and contraction of the vessel, trunnion support structure, and the trunnion shaft means along a direction parallel to the trunnion axis.

6. The combination of claim 4 further including
fluid pressure measuring means connected to the plurality of fluid pressure supply lines to monitor operation of the fluid bearing load support.

7. The combination of claim 6 further including
means for indicating abnormal fluid pressure operation.

8. The combination of claim 6 further including
means for automatically interrupting tilting of the vessel responsively to the fluid pressure measuring means connected to the supply lines.

9. The combination of claim 1 in which bearing raceway means is defined by contiguously associated spherical-configuration surfaces associated with the trunnion shaft means and bearing block means with the spherical-configuration surface associated with the trunnion shaft means being separable from the spherical-configuration surface of the bearing block means by fluid under pressure applied through the fluid pressure support means at load bearing portions to provide mechanical clearance between the load bearing portions of such spherical-configuration surfaces so as to compensate for deflection along the trunnion axis due to sag of the trunnion shaft means.

10. The combination of claim 9 in which the fluid pressure support means include a plurality of fluid pressure pads disposed in the load bearing portion of the spherical-configuration surface of the bearing block means.

11. The combination of claim 9 in which the plurality of fluid pressure pads include at least two fluid pressure pads disposed on each opposite side of a vertical plane through the trunnion axis.

12. The combination of claim 11 further including
a plurality of fluid pressure supply lines each connected to at least a pair of fluid pressure pads located in diagonally opposed spaced relationship on opposite sides of the vertical plane through the trunnion axis.

13. The combination of claim 9 further including
fluid pressure measuring means connected to the plurality of fluid pressure supply lines to monitor operation of the fluid bearing load support.

14. The combination of claim 9 further including
means for indicating abnormal fluid pressure operation.

15. The combination of claim 9 further including
means for automatically interrupting tilting of the vessel responsively to the fluid pressure measuring means connected to the supply lines.

* * * * *